United States Patent [19]

Burton

[11] 4,238,541

[45] Dec. 9, 1980

[54] IDENTIFYING MARKER FOR TEAR PERFORATION LINES OF ROLLED PAPER WEBS

[76] Inventor: William E. Burton, 1632 S. Weller St., Apt. #B206, Seattle, Wash. 98144

[21] Appl. No.: 71,305

[22] Filed: Aug. 30, 1979

[51] Int. Cl.³ ........................ B65D 65/28; G09F 3/00; B32B 3/00; B32B 7/00

[52] U.S. Cl. ...................................... 428/43; 427/285; 427/288; 428/211; 428/537; 428/906

[58] Field of Search ............... 427/285, 288, 289, 290; 428/43, 211, 906, 537

[56] References Cited

U.S. PATENT DOCUMENTS

| | | | |
|---|---|---|---|
| 2,266,958 | 12/1941 | Corbin | 428/43 |
| 2,328,109 | 8/1943 | Thompson | 428/906 X |
| 3,293,683 | 12/1966 | Wyant | 428/43 X |
| 3,479,203 | 11/1969 | Broadhurst | 427/285 |
| 3,708,383 | 1/1973 | Thomas et al. | 428/43 X |

*Primary Examiner*—Michael R. Lusignan
*Attorney, Agent, or Firm*—Seed, Berry, Vernon & Baynham

[57] ABSTRACT

Markings for identifying rows of spaced apart tear perforations on rolled paper webs for easy identification of such perforations in low light conditions or by visually handicapped individuals. Identification of the tear perforations allows individual panels or lengths of panels to be torn from the roll along the perforation line so that the panels have a relatively smooth edge and are of the preset size. The identifying markings may be arrows placed at each end of the tear perforation line, contrasting strips superimposed on the perforations which permit clearer sighting of the perforations or other marks. Embossed identifying marks may also be used to allow a visually handicapped or blind person to feel the exact position of the tear perforation end.

6 Claims, 4 Drawing Figures

FIG. 1
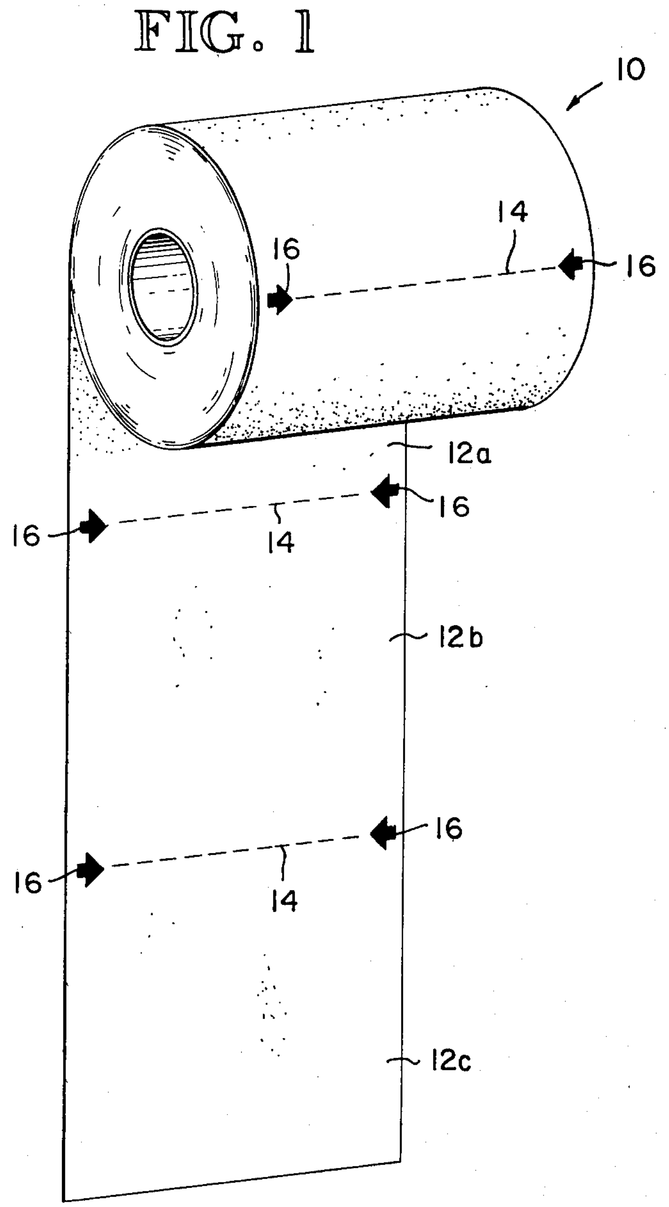
FIG. 2
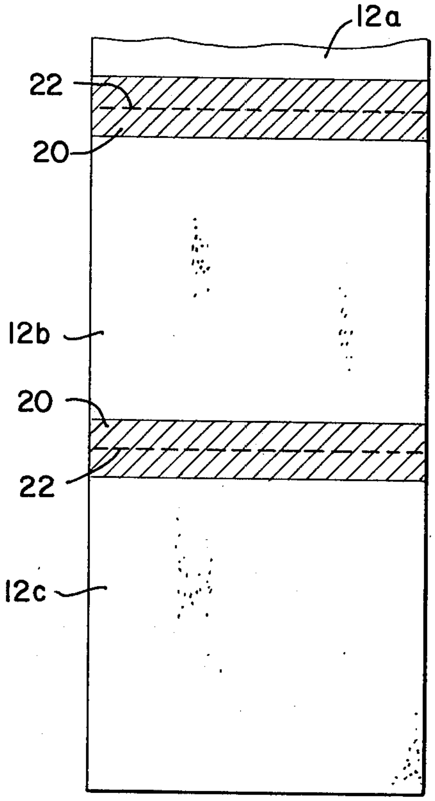
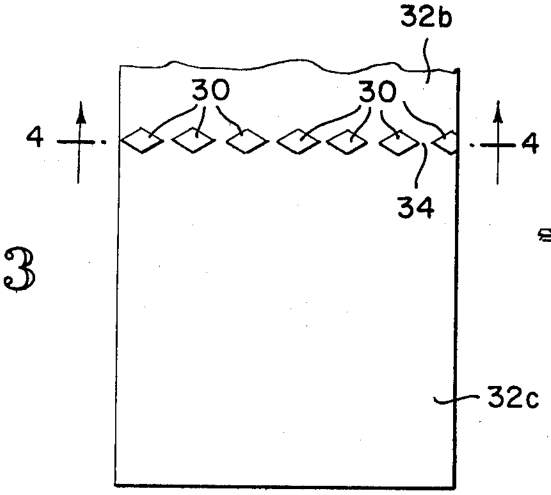
FIG. 3
FIG. 4
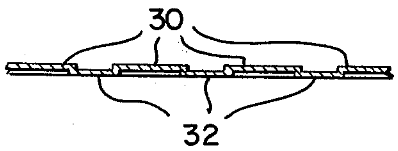

IDENTIFYING MARKER FOR TEAR PERFORATION LINES OF ROLLED PAPER WEBS

BACKGROUND OF THE INVENTION

1. Field of the Invention

This invention relates to paper products, and more particularly to a means for identifying spaced apart lines of tear perforations formed in rolled paper webs.

2. Description of the Prior Art

Rolls of paper used for domestic and other purposes containing mechanical perforations for easy separation of individual panels are in common use. Examples include paper towels for household and industrial uses, and bathroom toilet tissue. Until this time it has been difficult to identify these tear perforations under certain conditions such as in poor lighting and for those who are visually handicapped. Consequently the paper is often severed at undesirable locations and/or with an irregular edge thereby making use of the panel difficult or inconvenient and often resulting in unnecessary waste.

SUMMARY OF THE INVENTION

It is an object of this invention to allow easy identification of the tear perforations on rolled paper in areas where there is little or no light.

Another object of the invention is to aid persons with limited vision to easily identify the tear perforations of rolled paper.

It is still another object of the invention to provide a means of identifying the tear perforations of rolled paper by feel so that the perforations can be located either in no light conditions or by totally blind individuals.

It is a further object of the invention to provide a means of identifying the tear perforations of rolled paper webs which will eliminate the unnecessary waste of paper due to the inability to see or feel the exact length of paper required.

BRIEF DESCRIPTION OF THE DRAWINGS

FIG. 1 is an isometric view of a roll of paper having one form of tear perforation markings.

FIG. 2 is a plan view of sheet paper having another means for identifying tear perforations.

FIG. 3 is a plan view having embossed markings for identifying tear perforations in a roll of paper.

FIG. 4 is a cross-sectional view taken along the line 4—4 of FIG. 3.

DETAILED DESCRIPTION OF THE INVENTION

As illustrated in FIG. 1, a roll 10 of paper 12 has spaced apart lines of tear perforations 14 extending transversely across the paper 12. The perforations 14 create a line of reduced tensile strength to assist in the separation of individual panels 12*a*, 12*b* and 12*c*, which may be conventional toilet tissue as illustrated. In order to enable easy identification of the tear perforations 14 a marking, which may be arrows 16 is located at each end of the line of tear perforations 14. These arrows 16 clearly identify the tear perforations 14 as the paper 12 is unrolled so that the paper 12 can easily be torn into individual panels 12*a*, *b* and *c* having a preset size and relatively smooth edges.

Another embodiment of the invention having an identifying strip 20 superimposed on each tear perforation 22 is illustrated in FIG. 2. Since the identifying strips 20 are substantially larger than the identifying arrows 16 of FIG. 1, the embodiment of FIG. 2 may be more desirable for use in darker conditions or by the less visually perceptive.

FIGS. 3 and 4 show embossed identifying marks 30 covering the full width of the paper 32 where the tear perforations 34 are contained. The alternating raised and depressed areas formed by the embossed marks 30 allow a visually handicapped person to feel exactly where the roll of paper 32 should be separated so the paper 32 will be torn at the desired length and no waste will occur.

Although only three specific embodiments for identifying transverse lines of tear perforations are disclosed, it will be understood that the identifying markers may have virtually any form. Similarly, although only printing and embossing of the markers on the web are described it will be understood that the markers may be placed on the web in accordance with a variety of techniques such as by photo transfer, electrostatic printing, etc.

I claim:

1. In a rolled web of paper having a plurality of lines of tear perforations extending transversely across said web at spaced apart locations thereof, the improvement comprising a visually perceiveable identifying marker placed adjacent each line of said tear perforations to facilitate identification of said line thereby allowing said web to be torn along said line of tear perforations in low light conditions and by visually handicapped individuals.

2. The rolled web of paper of claim 1 in which said identifying markers include an ink mark having a color which contrasts with said paper.

3. The rolled web of paper of claim 2 wherein said identifying markers include an arrow positioned adjacent each longitudinal edge of said web with said arrows pointing toward each other along said line of tear perforations such that the location of said line is readily identified by the heads of said arrows.

4. The rolled web of paper of claim 2 wherein said markers include a transversely extending, rectangular marking strip superimposed on each of said lines of tear perforations.

5. The rolled web of paper of claim 1 in which said identifying markers include impressions embossed in said web closely adjacent said line of tear perforations such that said identifying markers are identifiable tactily as well as visually.

6. The rolled web of paper of claim 5 wherein each of said impressions is a transverse row of diamond shaped embossing superimposed on said row of tear perforations.

* * * * *